United States Patent
Satterfield

(10) Patent No.: US 12,483,498 B2
(45) Date of Patent: Nov. 25, 2025

(54) DYNAMIC RULE-BASED MESSAGE ROUTING SYSTEMS

(71) Applicant: Capital One Services, LLC, McLean, VA (US)

(72) Inventor: Mark Satterfield, Haymarket, VA (US)

(73) Assignee: Capital One Services, LLC, McLean, VA (US)

( * ) Notice: Subject to any disclaimer, the term of this patent is extended or adjusted under 35 U.S.C. 154(b) by 582 days.

(21) Appl. No.: 17/411,850

(22) Filed: Aug. 25, 2021

(65) Prior Publication Data

US 2023/0062741 A1   Mar. 2, 2023

(51) Int. Cl.
| H04L 12/725 | (2013.01) |
| H04L 45/302 | (2022.01) |
| H04L 45/74 | (2022.01) |
| H04L 47/20 | (2022.01) |
| H04L 47/24 | (2022.01) |

(52) U.S. Cl.
CPC ............ *H04L 45/306* (2013.01); *H04L 45/74* (2013.01); *H04L 47/20* (2013.01); *H04L 47/24* (2013.01)

(58) Field of Classification Search
CPC ....... H04L 45/306; H04L 45/74; H04L 47/20; H04L 47/24
See application file for complete search history.

(56) References Cited

U.S. PATENT DOCUMENTS

| 11,333,772 B2 * | 5/2022 | Del Regno | ............ G01S 19/07 |
| 2019/0166232 A1 * | 5/2019 | Bullock | .............. H04L 41/0226 |
| 2020/0120168 A1 * | 4/2020 | Nainar | .................... H04L 45/30 |
| 2021/0409917 A1 * | 12/2021 | Wang | ...................... H04W 4/40 |
| 2022/0272794 A1 * | 8/2022 | Aftab | .................... H04W 24/02 |

OTHER PUBLICATIONS

"3 Methods for Microservice Communication," pp. 1-11, Aug. 27, 2019, LogRocket Frontend Monitoring, retrieved from: https://blog.logrocket.com/methods-for-microservice-communication/, on Aug. 24, 2021.

"Communication in a microservice architecture," pp. 1-8, Jan. 30, 2020, Microsoft Docs., retrieved from: https://docs.microsoft.com/en-us/dotnet/architecture/microservices/architect-microservice-container-applications/communication-in-microservice-architecture, on Aug. 24, 2021.

* cited by examiner

*Primary Examiner* — Mansour Oveissi
(74) *Attorney, Agent, or Firm* — Banner & Witcoff, Ltd.

(57) ABSTRACT

Aspects described herein may allow messages to be routed between different programs or microservices based on a plurality of rules. For example, a computing device may receive, from a data stream, a plurality of messages, wherein each message, of the plurality of messages, may be converted from information associated with a microservice. The computing device may obtain, from the data stream, a first message. The computing device may also obtain a plurality of rules. The computing device may determine, based on at least one rule of the plurality rules, a mapping between a characteristic and an identifier of a target, and may convert, based on the at least one rule and determining that the first message has the characteristic, a copy of the first message to a format suitable to be sent to the target. In this way, communication between independently developed programs may be facilitated.

20 Claims, 6 Drawing Sheets

| Microservice ID 505 | Event Type 510 | Event Description 515 | Payload 520 |

| Characteristic: Event Type Field = Notification to be sent 535 | | |
|---|---|---|
| Downstream Target ID: 01 540 | Address 545 | Format Requirement 550 |
| Downstream Target ID: 02 560 | Address 565 | Format Requirement 570 |

DYNAMIC RULE-BASED MESSAGE ROUTING SYSTEMS

FIELD OF USE

Aspects of the disclosure relate generally to electronic devices. More specifically, aspects of the disclosure may provide for systems and methods for dynamically routing messages to downstream devices or applications.

BACKGROUND

A software application may be divided into a plurality of microservices in a service-oriented architecture. Each one of the microservices may be developed to perform a service. A microservice may need to cooperate with upstream or downstream microservices in order to achieve complex functionalities. For example, a notification microservice that performs the service of sending text notifications to users may need to cooperate with an upstream microservice that generates the content of the text messages. For another example, an authentication microservice that authenticates the user's information may need to cooperate with a facial recognition microservice to extract patterns from a photo. Defining communication protocols between those microservices causes a huge burden to software developers because defining those protocols may require an understanding of both the upstream and downstream microservices. Those upstream microservices and downstream microservices may be developed independently and may be updated or modified independently. Therefore, systems and methods that facilitate the communication between microservices are needed.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a computer-implemented method for dynamically routing messages based on a plurality of rules to facilitate the communication between microservices. In at least one embodiment, a computing device may receive, from a data stream, a plurality of messages, wherein each message, of the plurality of messages, may be converted from information associated with a microservice. The computing device may assemble the plurality of messages into a queue, and/or then obtain, from the queue, a first message converted from information associated with a first microservice. The computing device may obtain, from a database, a plurality of rules, and/or apply the plurality of rules on the first message by: determining, based on at least one rule of the plurality rules, a mapping between a characteristic and an identifier of a target; converting, based on the at least one rule and determining that the first message has the characteristic, a copy of the first message to a format suitable to be sent to the target; and/or sending, the copy to the target. For example, the characteristic indicates a value of an attribute field in the first message.

In some instances, the computing device may receive, from a second target, a request to obtain messages having a second characteristic; and/or may store, into the database, a second rule comprising: an identifier of the second target, and/or a mapping between the second characteristic and the second target.

In some instances, the computing device may receive, from a second target, a request to obtain messages that provide information to perform a type of action; determine, based on the type of action, a second rule of the plurality of rules; and associate, with the second rule, an identifier of the second target.

In some instances, the computing device may obtain, from the queue, a second message comprising an indication indicative of a relationship between the first message and the second message; and determine, based on: the relationship, the first microservice, and/or the target, a destination of the second message.

In some instances, the first message may comprise an event status associated with the first microservice. The event status may indicate an instance is created by the first microservice.

In some instances, the computing device may convert a copy of the first message to a format suitable to be sent to the target by converting the copy to a text message.

In some instances, the computing device may further obtain a policy associated with the first microservice; and obtaining the plurality of rules may be further based on the policy.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 5A shows an exemplary message in accordance with one or more illustrative aspects discussed herein;

FIG. 5B shows an exemplary rule in accordance with one or more illustrative aspects discussed herein.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer-readable media for routing messages.

Before discussing these concepts in greater detail, however, several examples of a computing device that may be used in implementing and/or otherwise providing various aspects of the disclosure will first be discussed with respect to FIG. 1.

Figure 1:
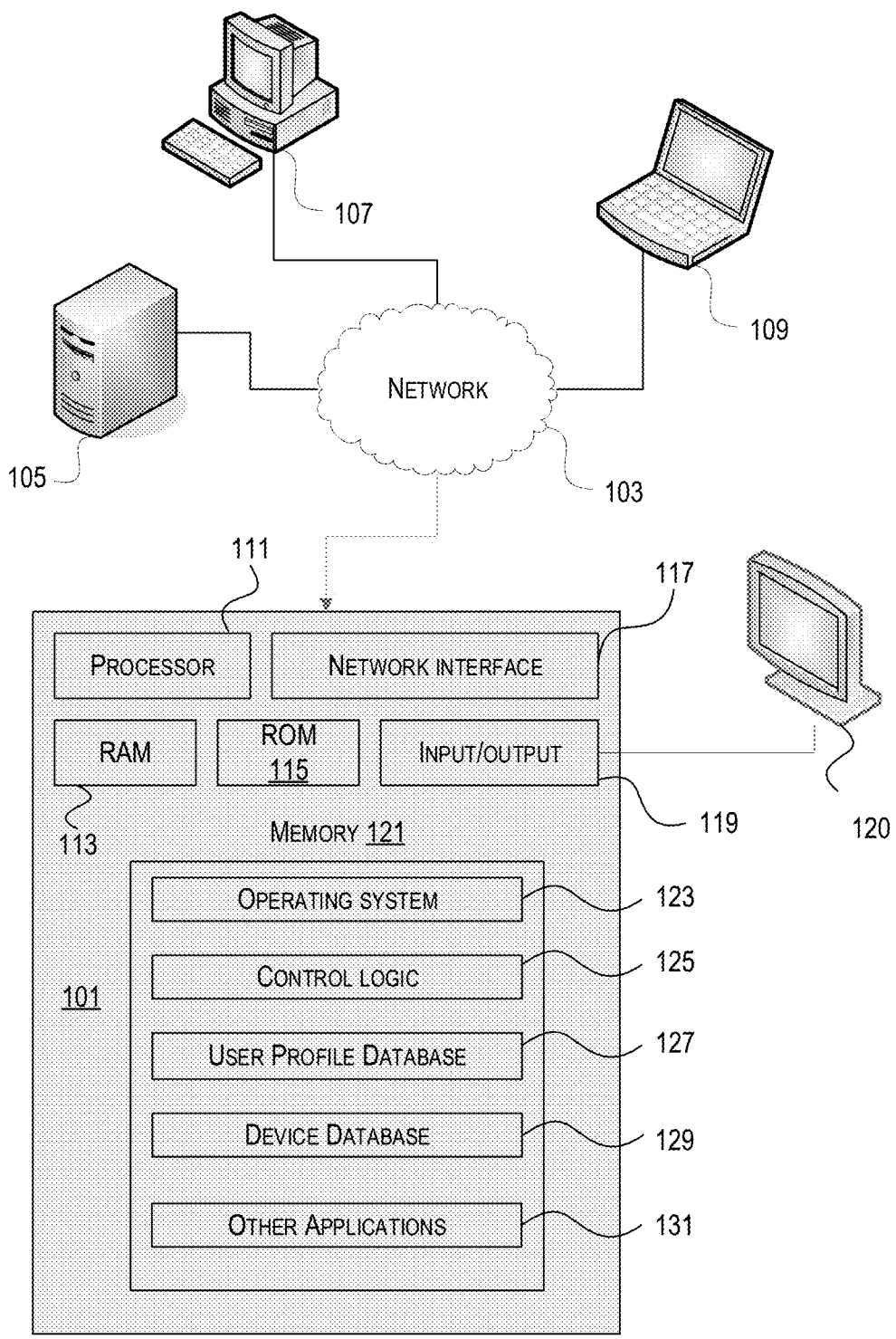
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading or executing instructions and performing one or more actions based on the instructions. In some embodiments, computing device 101 may represent, be incorporated in, or include various devices such as a desktop computer, a computer server, a mobile device (e.g., a laptop computer, a tablet computer, a smartphone, any other type of mobile computing devices, and the like), or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), or other processing units such as a processor adapted to perform computations associating converting information, routing copies of messages, or other functions described herein. I/O 119 may include a variety of interface units and drives for reading, writing, displaying, or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling the overall operation of the computing device 101, control logic 125 for instructing computing device 101 to perform aspects discussed herein. Furthermore, memory 121 may store various databases and applications depending on the particular use, for example, user profile database 127, remote device database 129, and other applications 131 may be stored in a memory of a computing device used at a server system that will be described further below. Control logic 125 may be incorporated in or may comprise a linking engine that updates, receives, or associates various information stored in the memory 121. In other embodiments, computing device 101 may include two or more of any or all of these components (e.g., two or more processors, two or more memories, etc.) or other components or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125.

One or more aspects discussed herein may be embodied in computer-usable or readable data or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer-executable instructions may be stored on a computer-readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field-programmable gate arrays (FPGA), and the like. Particular data structures may be used to more effectively implement one or more aspects discussed herein, and such data structures are contemplated within the scope of computer-executable instructions and computer-usable data described herein. Various aspects discussed herein may be embodied as a method, a computing device, a data processing system, or a computer program product.

Figure 2:
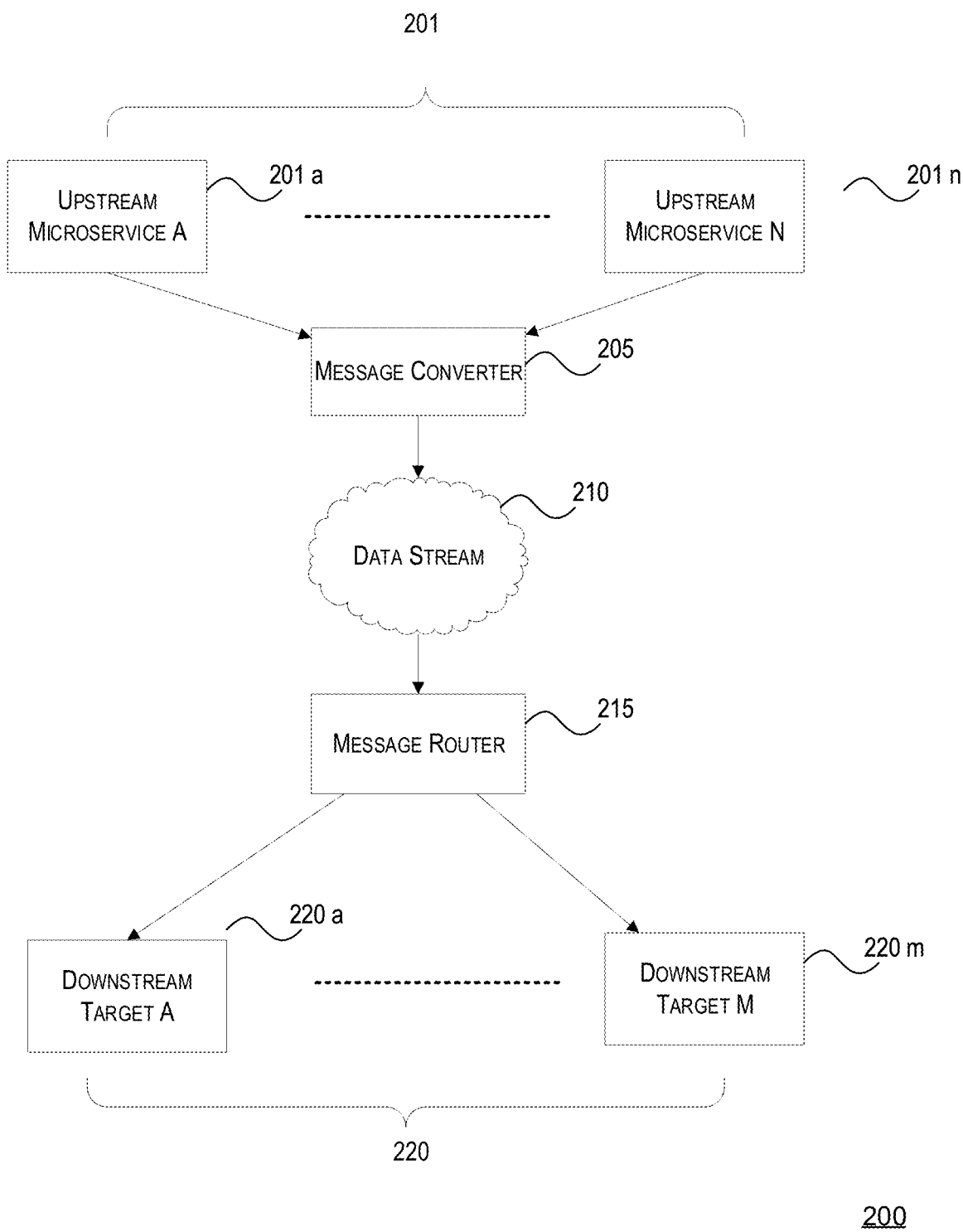
FIG. 2 depicts an example computing environment in accordance with one or more illustrative aspects discussed herein.

FIG. 2 depicts an illustrative computing environment for routing messages based on a plurality of rules in accordance with one or more example embodiments. Referring to FIG. 2, computing environment 200 may include one or more computer systems. For example, computing environment 200 may include one or more upstream microservices 201 (e.g., upstream microservice A 201a, . . . , upstream microservice N 201n), one or more message converters 205, one or more message routers 215, and one or more downstream targets 220 (e.g., downstream target A 220a, . . . downstream target M 220m). Each of the upstream microservices 201, message converters 205, message routers 215, downstream targets 220 may be executed on one or more computing devices 101 in FIG. 1.

A microservice may comprise any software programs, modules, applications, or devices executing any of the above. A microservice may be configured to perform one or more services. The upstream microservices 201a-201n may be executed on the same physical computing device 101, or may be executed on different physical computing devices 101. A downstream target 220 may be a microservice. The downstream targets 220a-220m may be executed on the same physical computing device 101 or may be executed on different physical computing devices. An upstream microservice 201 may send information to a message converter 205 (e.g., when the upstream microservice 201 is communicating with one or more downstream targets 220). For example, an upstream microservice 201a may be an online shopping microservice. A downstream target 220a may be a notification microservice. If the online shopping microservice completed an online order of a customer, that online shopping microservice may call the notification microservice, so that a notification to the customer may be sent via the notification microservice. In order to do so, the online shopping microservice may send information associated with the online shopping order to a message converter 205. As discussed in further detail below, the message converter 205 may convert the information into a message. The message may be routed to the notification microservice by the message router 215 as may be described in further detail below.

It will be appreciated that a microservice may be an upstream microservice 201, or a downstream target 220, or both an upstream microservice 201 and a downstream target 220. A microservice may be referred to as an upstream microservice 201 if the microservice sends a message out, and the same microservice may be referred to as a downstream target 220 if the microservice receives a message. Consistent with the example of the online shopping microservice and the notification microservice discussed above, after the notification microservice sends the notification to the customer, the notification microservice may send (e.g., via the message converter 205 or the message router 215) a second message back to the online shopping microservice to indicate that the notification has been successfully sent to the customer. From the perspective of the second message, the notification microservice may be referred to as an upstream microservice 201, while the online shopping microservice may be referred to as a downstream target 220.

The one or more message converters 205 may be implemented in one physical computing device or may be implemented on different physical computing devices. The message converters 205 may comprise an application programming interface (API). An upstream microservice 201 may send a message by calling the API associated with the message converter 205 to provide the information to be used by the message converter 205. The message converter 205 may convert the information to a message.

The message converters 205 may be located on the same device with one or more upstream microservices 201, or may be located remotely from one or more upstream microservices 201. If the message converter 205 is remote from an upstream microservice 201, the communication between that upstream microservice 201 and message converter 205 may be via a network. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 1.

The message converter 205 may be configured to create a data stream 210 comprising the messages. The message router 215 may be configured to receive the messages (e.g., from data stream 210) and route copies of the messages to one or more downstream targets 220 based on a plurality of rules.

The communication between the message router 215 and downstream targets 220 may be via a network. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 1.

Access to a particular server system may be limited to a particular device. Some or all of the data described herein may be stored using one or more data stores. Datastores may include but are not limited to relational databases, hierarchical databases, distributed databases, in-memory databases, flat file databases, XML databases, NoSQL databases, graph databases, or a combination thereof. Any file system may be used to store data using a database or flat file as appropriate.

The data transferred to and from various computing devices in computing environment 200 may include secure and sensitive data, such as confidential documents, customer personally identifiable information, and account data. Therefore, it may be desirable to protect transmissions of such data using secure network protocols and encryption, or to protect the integrity of the data when stored on the various computing devices. A file-based integration scheme or a service-based integration scheme may be utilized for transmitting data between the various computing devices. Data may be transmitted using various network communication protocols. Secure data transmission protocols or encryption may be used in file transfers to protect the integrity of the data such as, but not limited to, File Transfer Protocol (FTP), Secure File Transfer Protocol (SFTP), or Pretty Good Privacy (PGP) encryption. In many embodiments, one or more web services may be implemented within the various computing devices. Web services may be accessed by authorized external devices and customers to support input, extraction, and manipulation of data between the various computing devices in the computing environment 200. Web services built to support a personalized display system may be cross-domain or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, or firewalls. Such specialized hardware may be installed and configured in the computing environment 200 in front of one or more computing devices such that any external devices may communicate directly with the specialized hardware.

Figure 3A:
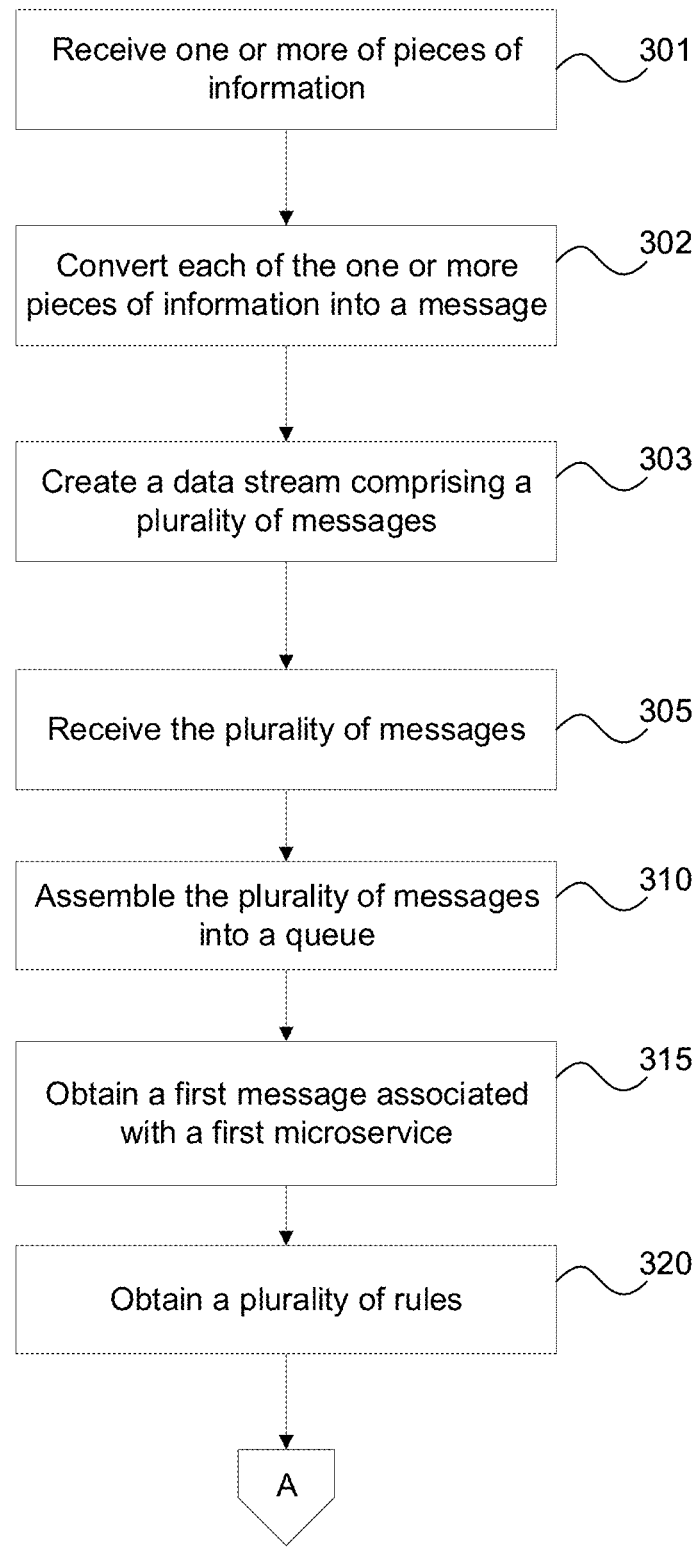
FIG. 3A and FIG. 3B are flow diagrams of an example method for dynamically routing messages in accordance with one or more illustrative aspects discussed herein.
Figure 3B:
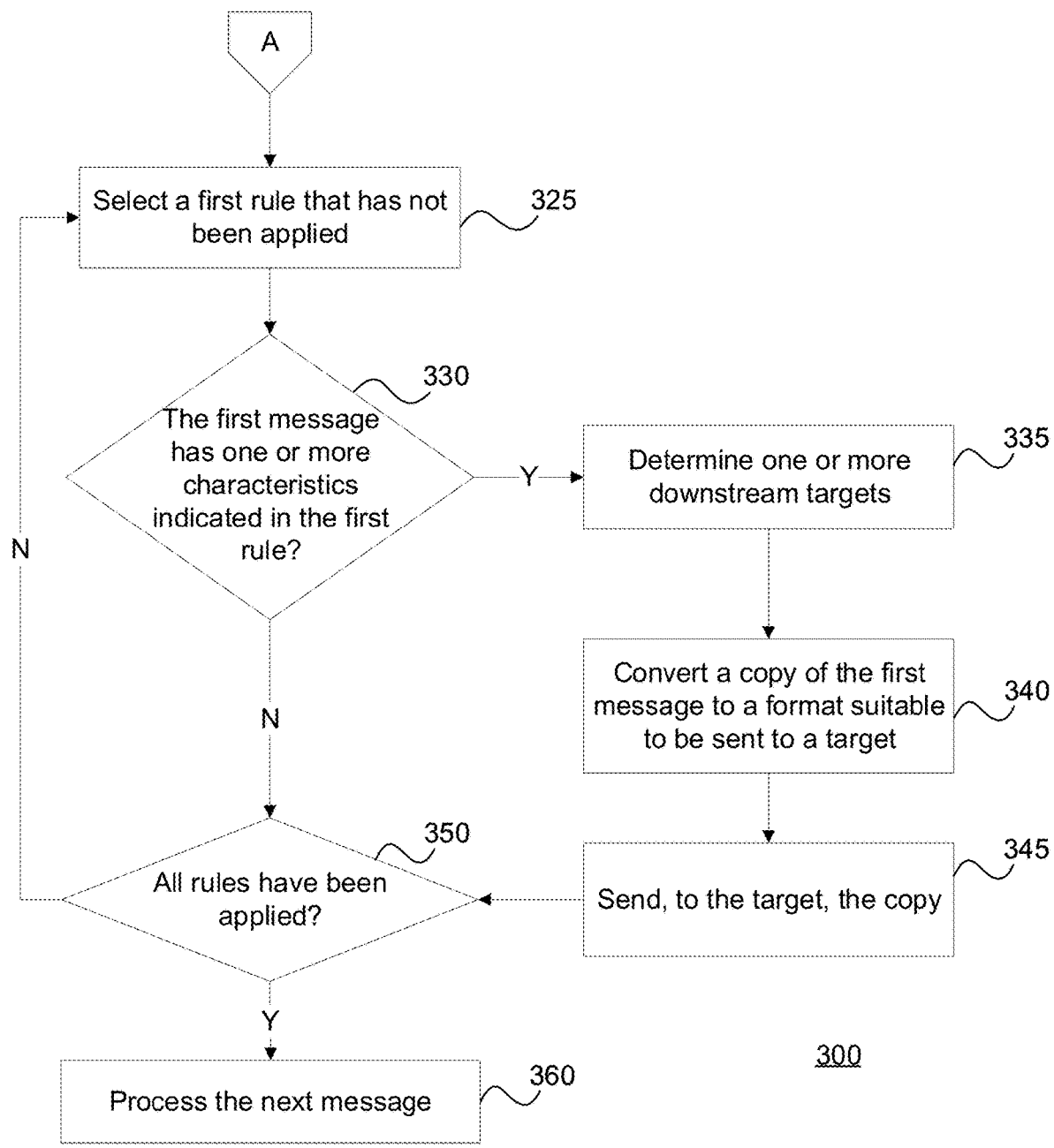

FIGS. 3A-3B are flow diagrams depicting a method 300 for routing messages based on a plurality of rules in accordance with one or more illustrative aspects discussed herein. The steps in method 300 may be performed by a system comprising, for example, one or more of message converters 205 and message routers 215, as may be shown in FIG. 2.

At step 301, the system may receive (e.g., from a plurality of upstream microservices 201) one or more pieces of information. For example, the one or more pieces of information may be received by the message converters 205. If an upstream microservice 201 communicates with one or more downstream targets 220, the upstream microservice 201 may send, to the system, one or more pieces of information to be included in the communication. The communication between an upstream microservice 201 and one or more downstream microservices 220 may be beneficial for a variety of reasons, and accordingly, the type of information included may vary. For example, as discussed above, an online shopping microservice may communicate with one or more notification microservices 220 to send notifications to an online shopping customer. In such an example, the information may comprise the address (e.g., phone number, email address) of the customer and the content of the notification (e.g., "your order has been successfully placed"). In another example, a data collection microservice may communicate with one or more machine-learning microservices to facilitate the machine-learning microservices to update a machine-learning model. In such an example, the information may comprise the data collected by the data collection microservice. In another example, one microservice may notify another microservice of an event status (e.g., an instance is created, an event is started, a task fails, etc.) so that the other microservice may cooperate with the one microservice accordingly. In such an example, the information may comprise the event status. Communication between microservices may be beneficial for other reasons and other types of information are possible.

At step 302, the system may convert each of the one or more pieces of information into a message. The message may conform with a first format (e.g., a protocol that the message router 215 understands). For example, the information provided by the upstream microservices 201 may be presented in a second format that the message router 215 does not understand. The system may convert the information into a message by converting data from the second format to the first format.

FIG. 5A shows an exemplary message 500. Message 500 may comprise multiple fields. For example, as is shown in FIG. 5A, message 500 may comprise microservice ID field 505, event type field 510, event description field 515, and a payload field 520. The microservice ID field 505 may comprise the identifier of the upstream microservice 201 associated with the message. Event type field 510 may comprise a general description of the message. Event description field 515 may comprise some detailed information associated with the message. Payload field 520 may comprise any additional data needed to be included. Consistent with the above example of the online shopping microservice sending customer notifications via one or more notification microservices, the microservice ID field 505 may comprise an identifier of the online shopping microservice, the event type field 510 may comprise "notification to be sent," the event description field 515 may comprise the customer's email address and phone number, and the payload filed 520 may comprise the content of the notification (e.g., "your order has been successfully placed").

Since an upstream microservice 201 may have been developed independently from any downstream targets 220, the upstream microservice 201 may not know what downstream targets 220 the message is to be sent to. For example, the online shopping microservice may only know that a notification may be sent to customers via one or more downstream targets 220, but may not know which downstream target(s) 220 may be used to send the notification. In that example, the message 500 may omit the microservice ID of any downstream targets 220.

Turning back to FIG. 3A, at step 303, the system may create a data stream 210 comprising the plurality of messages. For example, each of the one or more message converters 205 may establish a link with the message router 215 and may continuously send (e.g., via the link) messages that the message converter 205 converts.

At step 305, the system may receive the plurality of messages. The plurality of messages may be received by the message router 215 (e.g., via one or more links the message router 215 establishes with the one or more message converters 205).

At step 310, the system may assemble the plurality of messages into one or more queues. The system may maintain one or more queues and may add each message the system receives into one of the queues. Messages may be added into a queue in an order based on the time each message is received. For example, messages received earlier may be placed at an earlier position in the queue. If more than one queue is maintained by the system, each queue may be configured to hold messages of a different category. For example, one queue may be configured to hold messages of a normal priority, while another queue may be configured to hold messages of a high priority.

At step 315, the system may obtain, from a queue, a first message. The first message may be converted from information provided by a first upstream microservice 201a (e.g., the online shopping microservice). A message may be obtained by the system from a queue based on the message's position in the queue. For example, a message placed at an earlier position in the queue may be obtained earlier. The system may process the obtained message as discussed in the below steps 320-350. After the system completes the processing of the obtained message, the system may either discard that message or store that message in a storage location for future use. Then, the system may obtain another message for processing.

At step 320, the system may obtain, from a database, a plurality of rules associated with the first message. As may be discussed below, the plurality of rules may be used to route copies of the first message to one or more downstream targets 220.

Each one of the plurality of rules may indicate one or more characteristics to be identified in a message. For example, a characteristic may be associated with one or more values in one or more attribute fields of the message. Consistent with the exemplary message 500 described in FIG. 5A, one of the plurality of rules may indicate the value of the event type field 510 is "notification to be sent." Another one of the plurality of rules may indicate the value of the microservice ID field 505 is within a certain range.

Each one of the plurality of rules may also indicate a mapping between one or more characteristics (e.g., one characteristic or a combination of more than one characteristic) and one or more downstream targets 220. The mapping may be used to route messages that have the one or more characteristics to the one or more downstream targets 220, as may be discussed below in further detail.

The system may obtain a policy associated with the upstream microservice 201a associated with the first message, and the system may obtain the plurality of rules based on the policy. For example, the policy may indicate what downstream targets 220 the first message is allowed to be routed to, or what downstream targets 220 the first message is not allowed to be routed to. Based on the policy, the system may obtain a plurality of rules associated with downstream targets 220 that are allowed to receive the first message.

Turning to FIG. 3B, at step 325, the system may select one of the plurality of rules (e.g., a first rule) that has not been applied to the first message. The first rule may indicate one or more characteristics (e.g., a first characteristic). Applying a rule to a message may comprise determining whether one or more characteristics indicated in the rule can be identified in the message, and then process the message based on the determination.

At step 330, the system may determine whether the first message has one or more characteristics indicated in the first rule. For example, if a first characteristic indicated in the first rule is associated with one or more values in an attribute field of a message, the system may determine whether the values in that attribute field of the first message match the one or more values associated with the first characteristic. If the system determines that the first message has the one or more characteristics indicated in the first rule, the system may process the message, as may be discussed below at steps 335 to 345. If the system determines that the first message does not have the one or more characteristics indicated in the first rule, the method may proceed to step 350.

FIG. 5B shows an exemplary rule 530 that may be the first rule. For example, as may be shown in grid 535, the first rule 530 may indicate a first characteristic as "Event Type Field=Notification to be sent." Consistent with the first message 500 shown in FIG. 5A, the system may determine the message 500 associated with the online shopping microservice has the first characteristic because, as discussed above, the message 500's event type field 510 may be "notification to be sent." The system may further process the message 500, similar to as may be described below in steps 335 to 345.

At step 335, the system may determine, based on the first rule, one or more downstream targets 220. The first rule may comprise a mapping between one or more characteristics (e.g., a characteristic or a combination of more than one characteristic) and one or more downstream targets 220. The mapping may be indicated in the first rule and may be used to route, to the one or more downstream targets 220, copies of messages that have the one or more characteristics.

Consistent with the exemplary first rule 530 described in FIG. 5B, the first rule 530 may comprise a mapping between this first characteristic "Event Type Field=Notification to be sent" and one or more downstream targets 220. For example, as may be shown in grids 540 and 560, the one or more downstream targets 220 may comprise downstream target 01 and downstream target 02. For example, downstream target 01 may be a text notification microservice, while downstream target 02 may be an email notification microservice. The first rule 530 may also comprise other information that may be used to route copies of the first message. For example, grid 545 may comprise the address of the downstream target 01, grid 550 may comprise the format requirement of messages to be sent to the downstream target 01. Similarly, grid 565 may comprise the address of the downstream target 02, grid 570 may comprise the format requirement of messages to be sent to the downstream target 02. The type and number of downstream targets 220 are only examples, other types of downstream targets 220 may be possible, and other numbers of downstream targets identified by the mapping may be possible.

If the first rule indicates more than one characteristic, the first rule may comprise a mapping between a combination of more than one characteristic and one or more downstream targets 220. For example, as may also be shown in FIG. 5B, the first rule 530 may also indicate a second characteristic as "a phone number is included in the event description," and a third characteristic as "an email address is included in the event description." A first combination may be "event type field=notification to be sent" and "a phone number is included in the event description." The first rule may comprise a first mapping between the first combination and the text notification service. Similarly, the second combination may be "event type field=notification to be sent" and "an email address is included in the event description." The first rule may also comprise a second mapping between the second combination and the email notification microservice.

Any other information associated with the downstream targets 220 may also be included in the first rule. For example, instead of including the downstream target ID or address in the first rule (as may be shown in FIG. 5B), the first rule may comprise a pointer that points to a location storing the identifier of one more downstream targets 220. For example, the first rule may be configured to route messages that have a certain relationship with an earlier message (e.g., messages that are a response to an earlier message). Such messages may comprise an indication that indicates the relationship, and may indicate information associated with the earlier message. For example, messages that are a response to an earlier message may comprise a first field indicating the message is a response of an earlier message (e.g., event-type field 510=response), and a second field indicating the source ID/address of the earlier message. In this example, the first rule may comprise a pointer that points to the location of the second field in the message. The first rule may be used to route the response message to the source of the earlier message.

At step 340, the system may convert, based on the first rule and determining that the first message has the first characteristic (or a first combination of more than one characteristic), a copy of the first message to a format suitable to be sent to the one or more downstream targets 220 identified in the mapping. Consistent with the example regarding online shopping microservice and notification microservices discussed above, the system may convert a first copy of the first message to a format suitable to be sent to the text notification microservice 220a (e.g., the first copy may be converted to a format based on the format requirement indicated in grid 550 of the exemplary rule 530), and may convert a second copy of the first message to a format suitable to be sent to the email notification microservice 220b (e.g., the second copy may be converted to a format based on the format requirement indicated in grid 570 of the exemplary rule 530).

At step 345, the system may send the converted copy to the corresponding downstream targets 220. Consistent with the example discussed above, the system may send the first copy to the text notification microservice 220a, and the second copy to the email notification microservice 220b.

At step 350, the system may determine whether all rules have been applied. For example, the plurality of rules obtained at step 320 may be put into a queue, and the system may obtain one rule at a time from the queue to be applied to the first message. If the queue is empty, then the system may determine all rules have been applied. Alternatively or additionally, the system may also apply more than one rule simultaneously. For example, the system may obtain more than one rule and obtain more than one copy of the first message, and then the system may apply one or more rules on each copy in parallel.

If the system determines that all rules of the plurality of rules have been applied to the first message, the method may proceed to step 360. If the system determines at least one rule has not been applied, the method may proceed to step 325 to select another rule of the plurality of rules.

At step 360, the system may process the next message. For example, the next message may be a message obtained by the system from a queue assembled at step 310.

The steps of method 300 may be modified, omitted, or performed in other orders, or other steps added as appropriate. In some examples, steps 301 and 302 may be omitted. For example, if an upstream microservice 201 can generate messages that conform to the format the message router 215 understands, the upstream microservice 201 may directly send the messages into the data stream 210 without providing information to a message converter 205.

Figure 4:
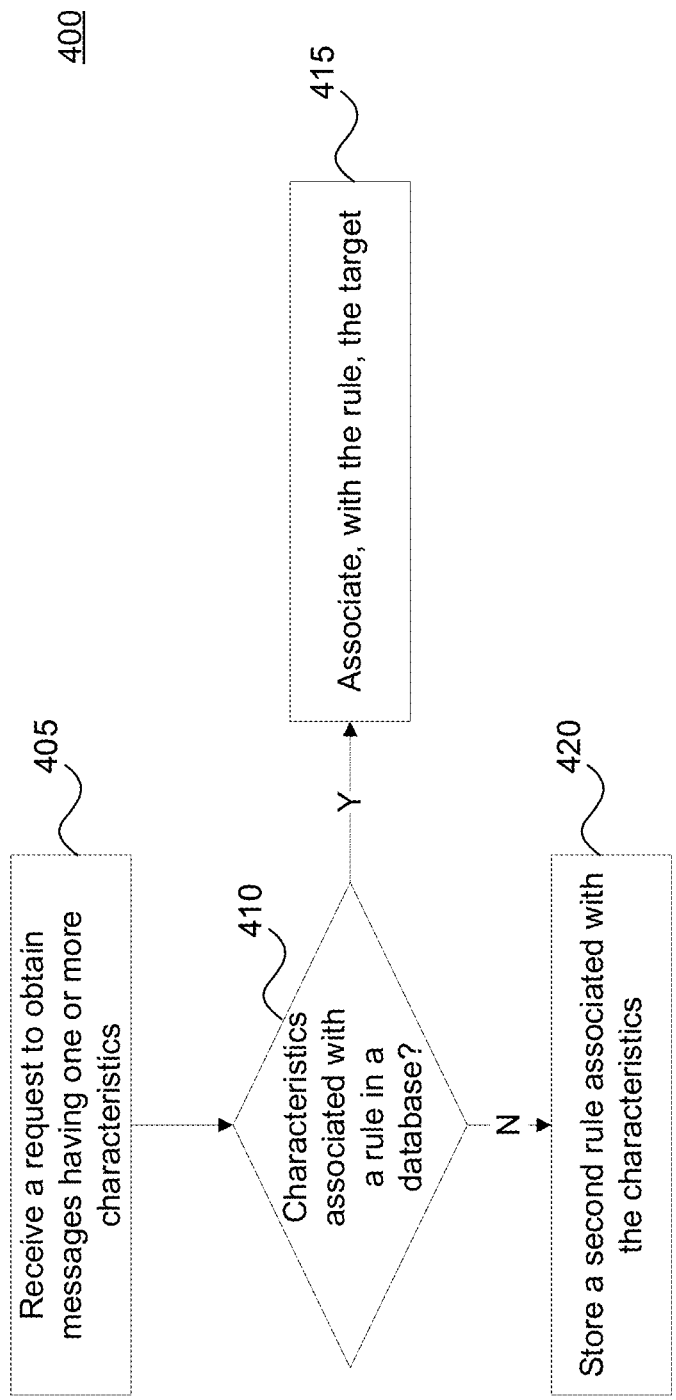
FIG. 4 is a flow diagram of an example method for associating a target with a rule in accordance with one or more illustrative aspects discussed herein.

FIG. 4 is a flow diagram depicting an exemplary method for associating a downstream target 220 with a rule in accordance with one or more illustrative aspects discussed herein. The steps in method 400 may be performed by a system comprising one or more of message converters 205 or message routers 215, as shown in FIG. 2. Method 400 may be used to generate one or more rules of the plurality of rules discussed in method 300. The steps of method 400 may be modified, omitted, or performed in other orders, or other steps added as appropriate.

At step 405, the system may receive, from a downstream target 220 (e.g., downstream target 220m), a request to obtain messages having one or more characteristics. The request may directly define the one or more characteristics (e.g., define one or more values in a certain field of the message), or the request may simply describe that the downstream target 220m requests to obtain messages that provide information to perform a type of action. If the request describes that the downstream target 220m requests to obtain messages that provide information to perform a type of action, the system may, based on the type of action, determine the one or more characteristics to be used to identify the messages to be routed to the downstream target 220m. For example, the downstream target 220m is an error diagnosing microservice that is configured to analyzing program errors based on log files. The request may indicate that the downstream target 220m requests to obtain messages that indicate an error occurs during the operation of a program. The system may determine (e.g., based on the protocol the message router 215 uses) that, if an upstream microservice 201 reports an operational error, a "job_failure" value may be included in the message (e.g., in the event type field 510). Based on the determination, the system may determine that the characteristic may be "event type field=job_failure."

At step 410, the system may determine whether the one or more characteristics are associated with a rule that is currently stored in a database (e.g., the database described at step 320). If the system determines a rule associated with the one or more characteristics is currently stored in the database, the method may proceed to step 415. If the system determines no rule is found to be associated with the one or more characteristics, the method may proceed to step 420.

At step 415, the system may associate an identifier of the downstream target 220m with the one or more characteristics indicated in the rule. For example, the system may add the identifier, as well as other information (e.g., address and format requirement, as similar to depicted in FIG. 5B), of the downstream target 220m into the rule.

At step 420, the system may store, into the database, a new rule associated with the one or more characteristics. The system may also store a mapping between the one or more characteristics and the identifier of downstream target 220m.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. Accordingly, the scope of the invention should be determined not by the embodiments illustrated, but by the appended claims and their equivalents.

What is claimed is:

1. A method comprising:
 receiving a plurality of messages, wherein each message, of the plurality of messages, is converted from information associated with a microservice;
 assembling the plurality of messages into a queue;
 obtaining, from the queue, a first message converted from information associated with a first microservice;
 obtaining, from a database, a plurality of rules;
 determining, based on at least one rule of the plurality of rules, a mapping between a characteristic and an identifier of a target;
 converting, based on the at least one rule and determining that the first message has the characteristic, a copy of the first message to a format suitable to be sent to the target;
 sending the copy to the target;
 receiving, from a second target, a request to obtain messages that provide information to perform a type of action;
 determining, based on the type of action, a second rule of the plurality of rules; and
 associating, with the second rule, an identifier of the second target.

2. The method of claim 1, wherein the characteristic indicates a value of an attribute field in the first message.

3. The method of claim 1, further comprising:
 receiving, from a second target, a request to obtain messages having a second characteristic; and
 storing, into the database, a second rule comprising:
  an identifier of the second target, and
  a mapping between the second characteristic and the second target.

4. The method of claim 1, further comprising:
 obtaining, from the queue, a second message comprising an indication indicative of a relationship between the first message and the second message; and
 determining, based on:
  the relationship,
  the first microservice, and
  the target,
 a destination of the second message.

5. The method of claim 1, wherein the first message comprises an event status associated with the first microservice.

6. The method of claim 5, wherein the event status indicates an instance is created by the first microservice.

7. The method of claim 1, wherein converting the copy of the first message to a format suitable to be sent to the target comprises converting the copy to a text message.

8. The method of claim 1, further comprising obtaining a policy associated with the first microservice; and wherein obtaining the plurality of rules is further based on the policy.

9. The method of claim 1, wherein the type of action comprises obtaining one or more messages.

10. A system comprising:
a first computing device, and
a second computing device;
wherein the first computing device comprises a first processor and first memory, the first computing device configured to:
receive, from the second computing device, a data stream comprising a first message;
assemble the first message and a plurality of other messages into a queue;
obtain, from the queue, the first message;
obtain, from a database, a plurality of rules;
determine, based on at least one rule of the plurality of rules, a mapping between a characteristic and an identifier of a target;
convert, based on the at least one rule and determining that the first message has the characteristic, a copy of the first message to a format suitable to be sent to the target;
send, the copy to the target;
receive, from a second target, a request to obtain messages that provide information to perform a type of action;
determine, based on the type of action, a second rule of the plurality of rules; and
associate, with the second rule, an identifier of the second target; and
wherein the second computing device comprises a second processor and second memory, the second computing device configured to:
obtain, from a first microservice, information;
convert, the information into the first message; and
send, to the first computing device, the data stream comprising the first message.

11. The system of claim 10, wherein the characteristic indicates a value of an attribute field in the first message.

12. The system of claim 10, wherein the first computing device is further configured to:
receive, from a second target, a request to obtain messages having a second characteristic; and
store, into the database, a second rule comprising:
an identifier of the second target, and
a mapping between the second characteristic and the second target.

13. The system of claim 10, wherein the first computing device is further configured to:
obtain, from the queue, a second message comprising an indication indicative of a relationship between the first message and the second message; and
determine, based on:
the relationship,
the first microservice, and
the target,
a destination of the second message.

14. The system of claim 10, wherein the first message comprises an event status associated with the first microservice.

15. The system of claim 14, wherein the event status indicates an instance is started by the first microservice.

16. The system of claim 10, wherein the first computing device is configured to convert the copy of the first message to a format suitable to be sent to the target by converting the copy to a text message.

17. The system of claim 10, wherein the first computing device is further configured to obtain a policy associated with the first microservice; and
wherein the first computing device is further configured to obtain, based on the policy, the plurality of rules.

18. The system of claim 10, wherein the type of action comprises obtaining one or more messages.

19. A non-transitory computer-readable medium storing computer instruction that, when executed by one or more processors, cause performance of actions comprising:
receiving a plurality of messages, wherein each message, of the plurality of messages, is converted from information associated with a microservice;
assembling the plurality of messages into a queue;
obtaining, from the queue, a first message converted from information associated with a first microservice, wherein the first message comprises an event status associated with the first microservice;
obtaining, from a database, a plurality of rules;
determining, based on at least one rule of the plurality of rules, a mapping between a characteristic and an identifier of a target;
converting, based on the at least one rule and determining that the first message has the characteristic, a copy of the first message to a format suitable to be sent to the target; and
sending, the copy to the target;
receiving from a second target, a request to obtain messages that provide information to perform a type of action;
determining, based on the type of action, a second rule of the plurality of rules; and
associating, with the second rule, an identifier of the second target.

20. The non-transitory computer-readable medium of claim 19, wherein the computer instructions are further configured to:
obtain, from the queue, a second message comprising an indication indicative of a relationship between the first message and the second message; and
determine, based on:
the relationship,
the first microservice, and
the target,
a destination of the second message.

* * * * *